Patented May 16, 1950

2,507,682

UNITED STATES PATENT OFFICE 2,507,682

HEAT-RESISTING CEMENT

Harold W. Schultz, Dayton, Ohio, assignor to General Motors Corporation, Detroit, Mich., a corporation of Delaware No Drawing. Application September 3, 1946, Serial No. 694,676

2 Claims. (Cl. 260—57)

This invention relates to cement and to a method for cementing or joining objects or articles particularly non-metallic objects to metallic objects.

It is, therefore, an object of this invention to provide a heat resistant high strength cement made from a thermosetting material which will form a strong bond between two objects.

In carrying out the above object, it is a further object to provide a phenol formaldehyde resin type of cement for use in cementing non-metallic objects to metallic objects.

Further objects will be apparent, reference being made to the following description, wherein preferred forms of the embodiments of the present invention are clearly described.

The present invention is primarily directed to the formulation of a heat resisting cement which will adequately bond brake linings, clutch facings and the like to metallic supports. It is apparent that the use of the cement is not limited to this type of application but may be used for many other bonding operations. However the cement as disclosed herein is particularly adaptable for this use due to its high strength in shear and heat resisting properties. In use, brake shoes and their linings attain relatively high temperatures, therefore, many of the conventional cements soften or fracture sufficiently to permit tearing away of the lining from the shoe. The temperature attained during braking has often been measured at above 400° F. During this period there is considerable stress in the bonding layer and if the cement softens to any extent or changed appreciable in physical characteristics at the operating temperature, the stress in shear will cause bond failure or breaking away of the lining from the brake shoe. Therefore, heat resistance, maintenance of suitable physical properties at high temperatures, and rapid curing properties are all basic requirements of the cement.

Many cements have been made in the past which include phenol formaldehyde resins but I have found that these cements do not come up to the requirements I desire. The aforementioned properties are necessary factors to the success of my invention and in this manner, formulas which deviate appreciably from the ranges given herein have not proven satisfactory under the conditions of use. Therefore, it is to be understood that I am limiting the scope of my invention to a specific, narrow range of ingredients which, when compounded in the manner described, hereinafter, will provide a cement that may be used for numerous bonding operations and which is particularly adaptable for bonding operations wherein the parts bonded operate at relatively high or low temperatures.

A preferred cement may be made as follows: 100 parts by weight of phenol crystals are mixed with 110 parts by weight formaldehyde solution (35 to 40%) and 4 parts of ammonium hydroxide. This mixture is refluxed for about an hour at approximately 210° F. after which it is distilled under a vacuum for about 45 minutes. During this period about 80 parts by weight of water is removed. One hundred and fifteen parts of this resin is then mixed with 6 parts of hexamethylenetetramine together with fillers, such as china clay in quantities of about 50 parts. Isopropyl, butyl alcohol or other suitable solvent is then added to adjust the solution to the desired viscosity.

Another embodiment is to use a master resin compound which may be mixed with the remaining constituents to form a cement. This master resin is formed by mixing formaldehyde solution (35%–40%) with phenol crystals preferably in equal proportions and a catalyst. In this respect, I have found that 150 parts of phenol crystals mixed with 150 to 165 parts of 35–40% formaldehyde solution together with from 10 to 15 parts of a catalyst such as, barium, sodium or ammonium hydroxide, make a satisfactory master resin. In preparation this mixture is refluxed for about one and one half hours at the temperature of about 195° F. The time may vary in proportion to the quantity, although the refluxing should be stopped when the material reaches a syrupy consistency. The product is then placed in a suitable shallow vessel and heating is continued at 135 to 140° F. until a viscosity of approximately 2200 C. P. at 75° F. is reached. This master resin after cooling is mixed with 5 parts of hexamethylenetetramine together with sufficient butyl alcohol to adjust the viscosity to approximately 900 C. P. whereupon the cement is ready for use. It is pointed out that polymerization of this cement progresses rapidly and should preferably be made up for use as required or approximately every three weeks. Also it should be stored in a cool place in order to maintain the cement in a satisfactory and useable condition during the storage period.

The cementing procedure is likewise quite critical and should be carried out in a manner hereinafter described wherein the metal part is grit or sand blasted and is then brushed or sprayed with a light coat of the cement. The lining material or non-metallic portion is likewise coated with the cement. The cement is then preferably dried either in the air or by use of heat to accelerate a condition of partial polymerization. The lining and the metal shoes are then clamped together in a suitable fixture and are heated in an air circulating furnace for from 20 to 25 minutes at a temperature of from 285 to 300° F. Samples made under these teachings were found to have at least a 95% effective bond and in most cases a 100% effective bond. The brake shoes were tested on a dynamometer making deceleration tests at 50 miles per hour in three minute cycles, deceleration of 30 ft./sec.$^2$ was obtained. The hot shoes after making 15 stops were removed and immersed in water for an hour, after which they were removed and placed in a cold box at 40° below zero for an hour. These shoes are then heated in an oven at 400° F. for 30 minutes, after which they are reinstalled on the dynamometer and were caused to make 15 stops at 25 miles per hour in ½ minute cycles at sufficient pressure to obtain 30 ft. per/sec.$^2$ deceleration.

The bond withstood all of these tests which were repeated several times on the same shoe and indicated a considerably better bond than heretofore obtained through the use of conventional cements sold on the market for cementing brake linings to brake shoes. Similarly the cement has been used satisfactorily for attaching clutch facings to metal backing plates wherein the clutch runs in hot oil. The insolubility of the cement and strength of bond made the product particularly desirable for this use.

While the embodiments of the present invention as herein disclosed, constitute preferred forms, it is to be understood that other forms might be adopted, all coming within the scope of the claims which follow.

What is claimed is as follows:

1. A heat resisting, strong cement for cementing non-metallic objects to metallic objects comprising in its compounded condition, 100 parts of phenol formaldehyde resin, 5 parts hexamethylenetetramine and sufficient solvent to cause the viscosity of the solution to become approximately 900 C. P., said resin being formed by the reflux of 150 parts of phenol crystals with 165 parts of 35 to 40% of formaldehyde solution and 12 parts of barium hydroxide at 195° F. for about one and one-half hours and then evaporating by heating the reaction product to a viscosity of about 2200 C. P.

2. A heat resisting, strong cement for cementing non-metallic objects to metal objects comprising in combination, a mixture of a phenol formaldehyde resin formed from a mixture of phenol crystals and a 40% formaldehyde solution mixed in the proportions of one part phenol crystals to 1$\frac{1}{10}$ parts formaldehyde solution, together with approximately $\frac{1}{10}$ part of an ingredient selected from the class consisting of barium hydroxide, sodium hydroxide and ammonium hydroxide, said material being refluxed for about an hour and a half at about 195° F., and then evaporating by heating to a viscosity of about 2200 C. P., 100 parts of said high viscosity resin being mixed with approximately 5 parts of hexamethylenetetramine and sufficient solvent to bring the final viscosity of the solution to approximately 900 C. P.

HAROLD W. SCHULTZ.

REFERENCES CITED

The following references are of record in the file of this patent:

UNITED STATES PATENTS

| Number | Name | Date |
|---|---|---|
| 1,188,014 | Redman | June 20, 1916 |
| 1,213,144 | Baekeland | Jan. 23, 1917 |
| 1,669,674 | Romieux | May 15, 1928 |
| 1,687,952 | Stander | Oct. 16, 1928 |
| 1,960,177 | Weber | May 22, 1934 |
| 1,972,307 | Loetscher | Sept. 4, 1934 |

FOREIGN PATENTS

| Number | Country | Date |
|---|---|---|
| 432,190 | Great Britain | July 19, 1935 |
| 706,190 | Germany | May 20, 1941 |